US011828883B2

(12) United States Patent
Tsuchimoto et al.

(10) Patent No.: US 11,828,883 B2
(45) Date of Patent: Nov. 28, 2023

(54) SENSOR CONTROLLER, SENSOR CONTROL METHOD, SENSOR CONTROL PROGRAM

(71) Applicant: DENSO CORPORATION, Kariya (JP)

(72) Inventors: Toshiyuki Tsuchimoto, Kariya (JP); Ryusuke Ohata, Kariya (JP)

(73) Assignee: DENSO CORPORATION, Kariya (JP)

( * ) Notice: Subject to any disclaimer, the term of this patent is extended or adjusted under 35 U.S.C. 154(b) by 422 days.

(21) Appl. No.: 17/114,113

(22) Filed: Dec. 7, 2020

(65) Prior Publication Data

US 2021/0173056 A1 Jun. 10, 2021

(30) Foreign Application Priority Data

Dec. 9, 2019 (JP) ................................ 2019-222340

(51) Int. Cl.

*G01S 7/497* (2006.01)
*G07C 5/08* (2006.01)
*G01S 7/481* (2006.01)

(52) U.S. Cl.

CPC ............ *G01S 7/497* (2013.01); *G01S 7/4817* (2013.01); *G07C 5/0841* (2013.01)

(58) Field of Classification Search

CPC ...... G01S 7/497; G01S 7/4817; G07C 5/0841
See application file for complete search history.

(56) References Cited

U.S. PATENT DOCUMENTS

2016/0094134 A1* 3/2016 Iyasu .................. H02M 3/3378 363/17
2016/0290961 A1* 10/2016 Aoki ....................... F01N 11/00
2016/0310085 A1* 10/2016 Delia ................. A61B 5/02405
2019/0011538 A1 1/2019 Schwarz et al.
2019/0162823 A1 5/2019 Eckstein et al.
2020/0209848 A1* 7/2020 Mercep ................. G01S 13/931

FOREIGN PATENT DOCUMENTS

CN 103676423 A * 3/2014 ............. G02B 27/26
JP H08-261753 A 10/1996
JP 2008-224614 A 9/2008
JP 2018-180181 A 11/2018

* cited by examiner

*Primary Examiner* — Behrang Badii
*Assistant Examiner* — Jay Khandpur
(74) *Attorney, Agent, or Firm* — MASCHOFF BRENNAN

(57) ABSTRACT

A sensor controller, which controls a first optical sensor and a second optical sensor respectively having beam irradiation ranges, shifted from each other, for scanning a substantially front direction and a substantially side direction of a vehicle. The sensor controller: determines when an abnormality occurs in either the first optical sensor or the second optical sensor; identifies an abnormal sensor in which abnormality has occurred and a normal sensor that maintains normality; and controls a beam pattern in a beam irradiation range of the normal sensor to have a degeneration pattern with a high density in a region overlapping a beam irradiation range of the abnormal sensor.

9 Claims, 19 Drawing Sheets

1
100
SENSOR DETERMINATION BLOCK
Sa, Sn
120
BEAM CONTROL BLOCK
P2 (Pn/Pds)
P1 (Pn/Pdf)
3
30
302
IMAGING CIRCUIT
301
IMAGING ELEMENT
300
BEAM ELEMENT
31L
31R
312
IMAGING CIRCUIT
311
IMAGING ELEMENT
310
BEAM ELEMENT
IoL
IoR
IoF

NORMAL PROCESS

NORMAL PROCESS

NORMAL PROCESS

SIDE DEGENERATION PROCESS

SIDE DEGENERATION PROCESS

SIDE DEGENERATION PROCESS

RIGHT-SIDE FRONT DEGENERATION PROCESS

RIGHT-SIDE FRONT DEGENERATION PROCESS

RIGHT-SIDE FRONT DEGENERATION PROCESS

NORMAL PROCESS

NORMAL PROCESS

NORMAL PROCESS

RIGHT-SIDE FRONT DEGENERATION PROCESS

2ND OPTICAL SENSOR (LEFT SIDE)
P2L=Pn

RIGHT-SIDE FRONT DEGENERATION PROCESS

1ST OPTICAL SENSOR
P1=Pdf

RIGHT-SIDE FRONT DEGENERATION PROCESS

2ND OPTICAL SENSOR (RIGHT SIDE)
P2R=0

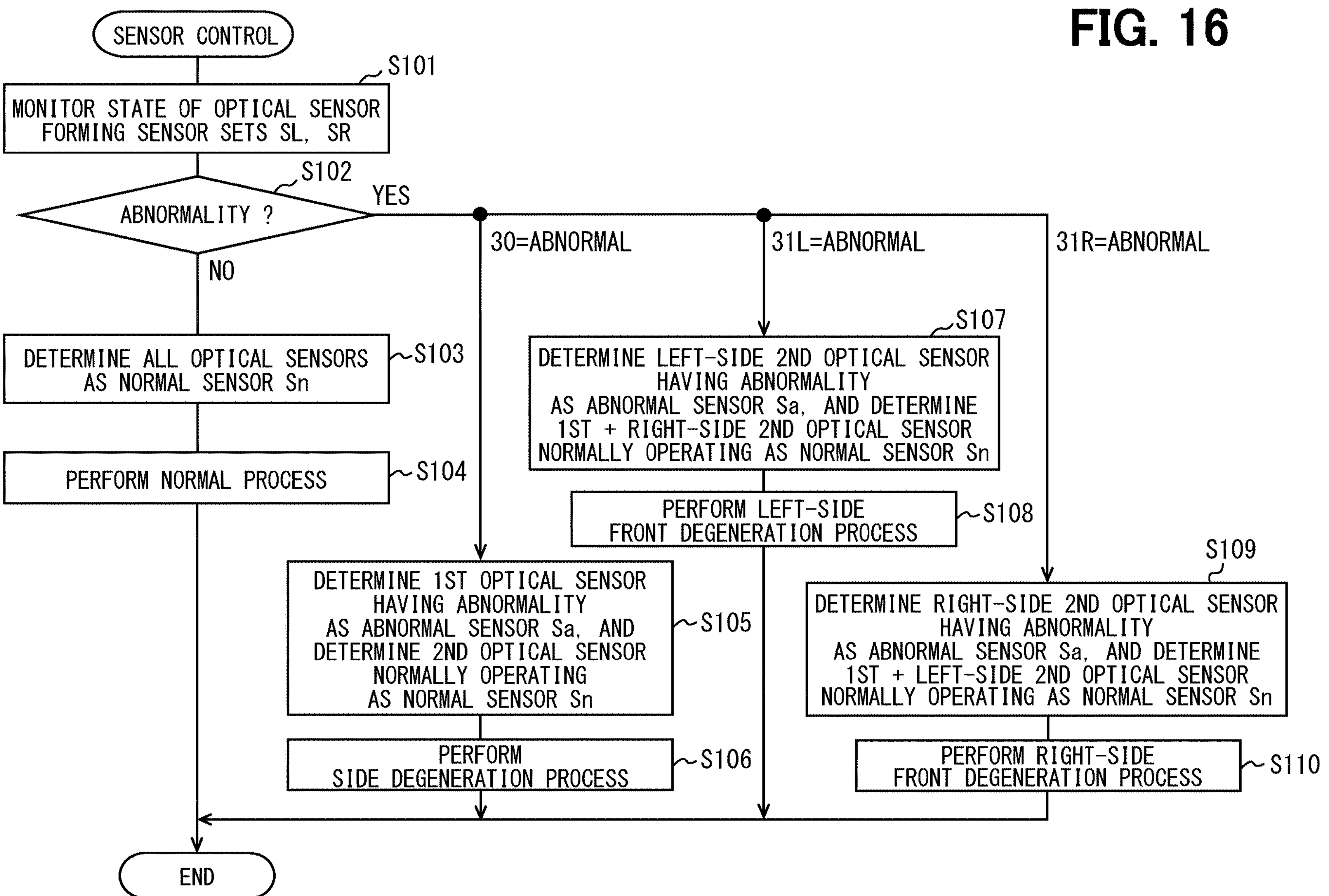
FIG. 16
SENSOR CONTROL
MONITOR STATE OF OPTICAL SENSOR FORMING SENSOR SETS SL, SR
S101
ABNORMALITY ?
S102
YES
NO
DETERMINE ALL OPTICAL SENSORS AS NORMAL SENSOR Sn
S103
PERFORM NORMAL PROCESS
S104
30=ABNORMAL
31L=ABNORMAL
31R=ABNORMAL
DETERMINE LEFT-SIDE 2ND OPTICAL SENSOR HAVING ABNORMALITY AS ABNORMAL SENSOR Sa, AND DETERMINE 1ST + RIGHT-SIDE 2ND OPTICAL SENSOR NORMALLY OPERATING AS NORMAL SENSOR Sn
S107
PERFORM LEFT-SIDE FRONT DEGENERATION PROCESS
S108
DETERMINE 1ST OPTICAL SENSOR HAVING ABNORMALITY AS ABNORMAL SENSOR Sa, AND DETERMINE 2ND OPTICAL SENSOR NORMALLY OPERATING AS NORMAL SENSOR Sn
S105
PERFORM SIDE DEGENERATION PROCESS
S106
DETERMINE RIGHT-SIDE 2ND OPTICAL SENSOR HAVING ABNORMALITY AS ABNORMAL SENSOR Sa, AND DETERMINE 1ST + LEFT-SIDE 2ND OPTICAL SENSOR NORMALLY OPERATING AS NORMAL SENSOR Sn
S109
PERFORM RIGHT-SIDE FRONT DEGENERATION PROCESS
S110
END

SIDE DEGENERATION PROCESS

SIDE DEGENERATION PROCESS

SENSOR CONTROLLER, SENSOR CONTROL METHOD, SENSOR CONTROL PROGRAM

CROSS REFERENCE TO RELATED APPLICATION

The present application is based on and claims the benefit of priority of Japanese Patent Application No. 2019-222340, filed on Dec. 9, 2019, the disclosure of which is incorporated herein by reference.

TECHNICAL FIELD

The present disclosure generally relates to sensor control technology for controlling an optical sensor of a vehicle.

BACKGROUND INFORMATION

Conventionally, a plurality of optical sensors are mounted on a vehicle so that the scanning beam irradiation ranges are different (e.g., shifted) from each other. As a result, the total scanning capability of the vehicle as a whole is improved.

SUMMARY

It is an object of the present disclosure is to provide a sensor controller that suppresses a decrease/deterioration in total scanning capability even when abnormality occurs in an optical sensor.

BRIEF DESCRIPTION OF THE DRAWINGS

Objects, features, and advantages of the present disclosure will become more apparent from the following detailed description made with reference to the accompanying drawings, in which:

FIG. 16 is a flowchart illustrating a sensor control method according to an embodiment;

DETAILED DESCRIPTION

Embodiments of the present disclosure are described based on the drawings.

Figure 1:
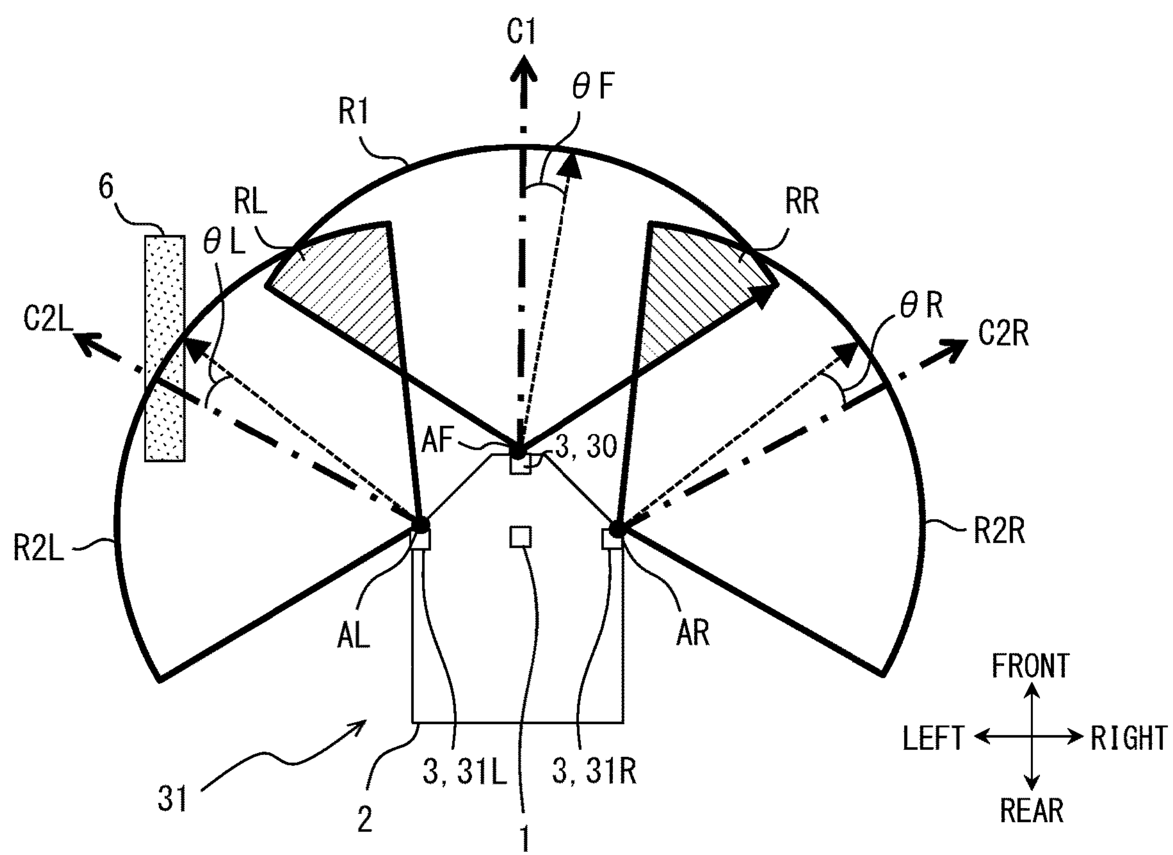
FIG. 1 is a schematic diagram for explaining a sensor system mounted on a vehicle together with a sensor controller according to an embodiment.

In FIG. 1, a sensor controller 1 according to an embodiment of the present invention is mounted on a vehicle 2. The vehicle 2 is, for example, an advanced driving assistance vehicle or an autonomous driving vehicle that travels based on an estimation result of self-movement. Of horizontal directions of the vehicle 2 on the horizontal plane, e.g., on a road, a direction of straight travel of the vehicle 2 is defined as a front-rear direction.

Figure 2:
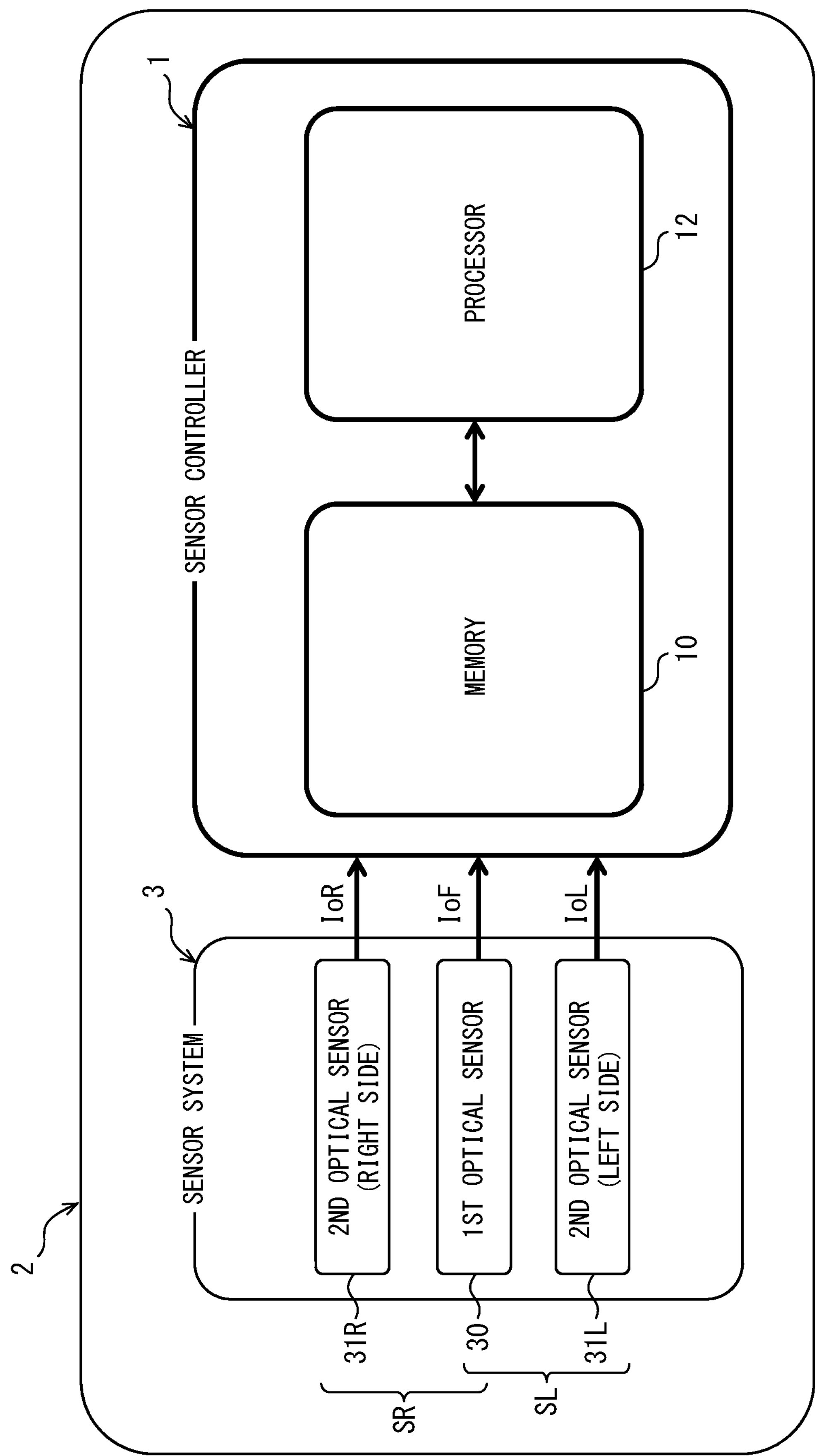
FIG. 2 is a block diagram of an overall configuration of the sensor controller according to an embodiment.
Figure 3:
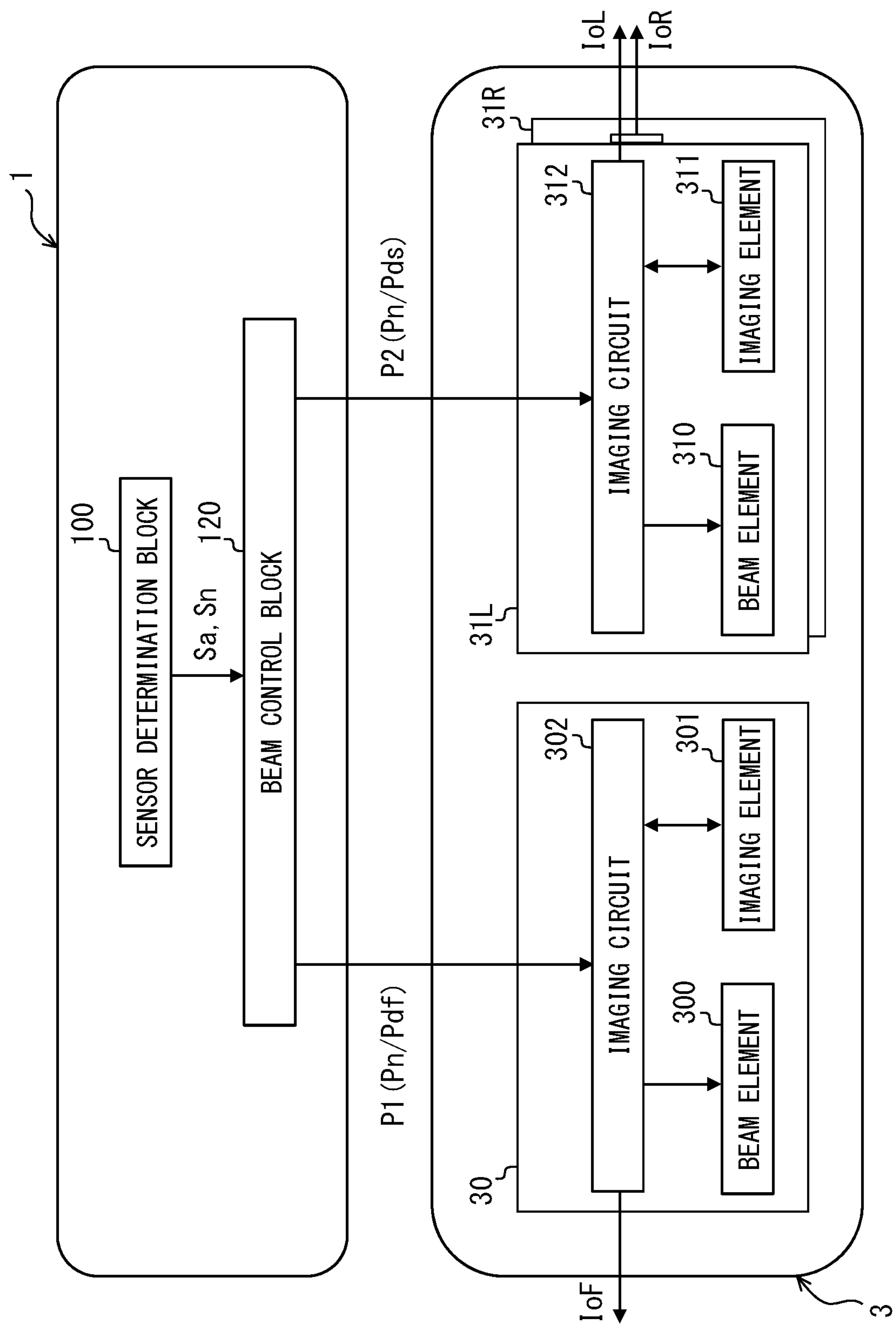
FIG. 3 is a block diagram of a detailed configuration of the sensor controller according to an embodiment.

In FIGS. 1 to 3, a vehicle 2 is equipped with a sensor controller 1 and a sensor system 3.

The sensor system 3 is configured to at least include optical sensors 30 and 31. The optical sensors 30 and 31 are so-called LIDARs (Light Detection and Ranging, or Laser Imaging Detection and Ranging) that can be used for motion estimation of the vehicle 2, for example. The optical sensors 30 and 31 output an optical image Io according to a beam reflection from a target 6 observed by a beam irradiation toward an outside of the vehicle 2. In the present embodiment, a single, first optical sensor 30 (also known as a front sensor) is mounted at the center of a front part of the vehicle 2, while a pair of second optical sensors 31 (31L and 31R) is mounted on the left and right side in the front part of the vehicle 2, respectively. The pair of optical sensors 31 is also known as a left sensor 31L and a right sensor 31R.

As shown in FIG. 3, the optical sensors 30 and 31L have beam elements 300 and 310, imaging elements 301 and 311, and imaging circuits 302 and 312, respectively. The imaging circuits 302 and 312 control the corresponding beam elements 300 and 310 and the imaging elements 301 and 311, respectively. The right sensor 31R is similar to the left sensor 31L.

For simplicity, initially consider only the front sensor 30 and the left sensor 31L. Specifically, the imaging circuits 302 and 312 each intermittently emit a respective laser beam, which is directed toward the outside of the vehicle 2 from the beam elements 300 and 310 in a form of a pulsed light having a substantially constant intensity, as indicated by broken line arrows in FIGS. 1 and 4 to 7. In the course of irradiation, beam irradiation ranges R1 and R2L, which are the scanning ranges of the optical sensors 30 and 31L respectively, are set to an angular range which centers respectively on beam reference directions C1 and C2L, and the beam irradiation ranges R1 and R2L spread to both sides around beam steering axes AF and AL by set angles. Here, the front beam irradiation range R1 is set in the front sensor 30 with the front beam reference direction C1 being set as a front direction along a line in the front-rear direction of the vehicle 2.

In the left sensor 31L on the left side, the beam irradiation range R2L with the beam reference direction C2L is set along a line extending toward a left front side of the vehicle 2. In the right optical sensor 31R on the right side, the beam irradiation range R2R with the beam reference direction C2R is set along a line extending toward a right front side of the vehicle 2. In each of the optical sensors 30, 31L, and 31R, the respective beam steering axis A, A1, and A2 is a starting point of the respective beam irradiation ranges R1, R2L, and R2R, and are set to a vertical direction of the vehicle 2 with respect to the horizontal plane. Alternatively, one or more of the steering axes may be inclined with respect to the vertical direction.

The imaging circuits 302 and 312 switch the respective beam steering angles θF and θL around the respective beam steering axis AF and AL, which determines the beam irradiation direction within the beam irradiation ranges R1 and R2L, for each intermittent beam irradiation timing at a constant time interval. In the course of such switching, the imaging circuits 302 and 312 define the beam steering angles θF and θL for each beam irradiation timing shown in FIGS. 4 to 7 at equal intervals or uneven intervals to determine the beam irradiation density in the beam irradiation ranges R1 and R2L, for even or uneven distribution of beam irradiation density. Therefore, the imaging circuits 302 and 312 adjust the distribution patterns of the beam irradiation density in the beam irradiation ranges R1 and R2L as beam patterns P1 and P2L of the optical sensors 30 and 31, respectively. For the right sensor 31R, the right beam irradiation range R2R, the right steering angle θR, and the right beam pattern P2R may be mirror images with respect to the left sensor 31L.

Figure 8A:
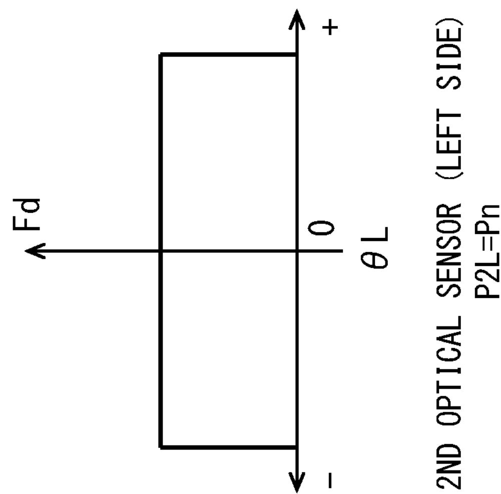
FIGS. 8A, 8B, 8C are respectively a characteristic diagram illustrating the beam control block according to an embodiment.
Figure 8B:
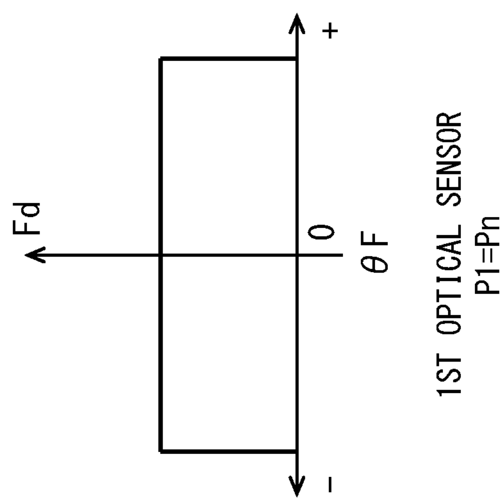
Figure 8C:
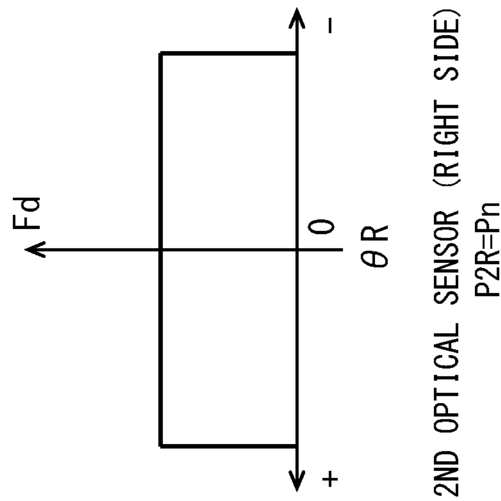

As shown in FIGS. 8A/B/C to 11A/B/C, in the front beam irradiation range R1 of the front sensor 30 that scans forward (i.e., a front field of the vehicle), the left beam steering angle θF takes a negative value in a left side region of the front beam reference direction C1 that is an angle zero (0), and takes a positive value in a right side region of the same direction C1, in definition. The left beam irradiation range R2L of the left sensor 31L that scans substantially laterally leftward. The right beam irradiation range R2R of the right sensor 31R scans substantially laterally rightward. The beam steering angles θL and θR each take a negative value in a frontward region of the respective beam reference directions C2L and C2R, which are defined as angle zero (0), and each take a positive value in a rearward region of the same directions C2L and C2R respectively, by definition.

Figure 5:
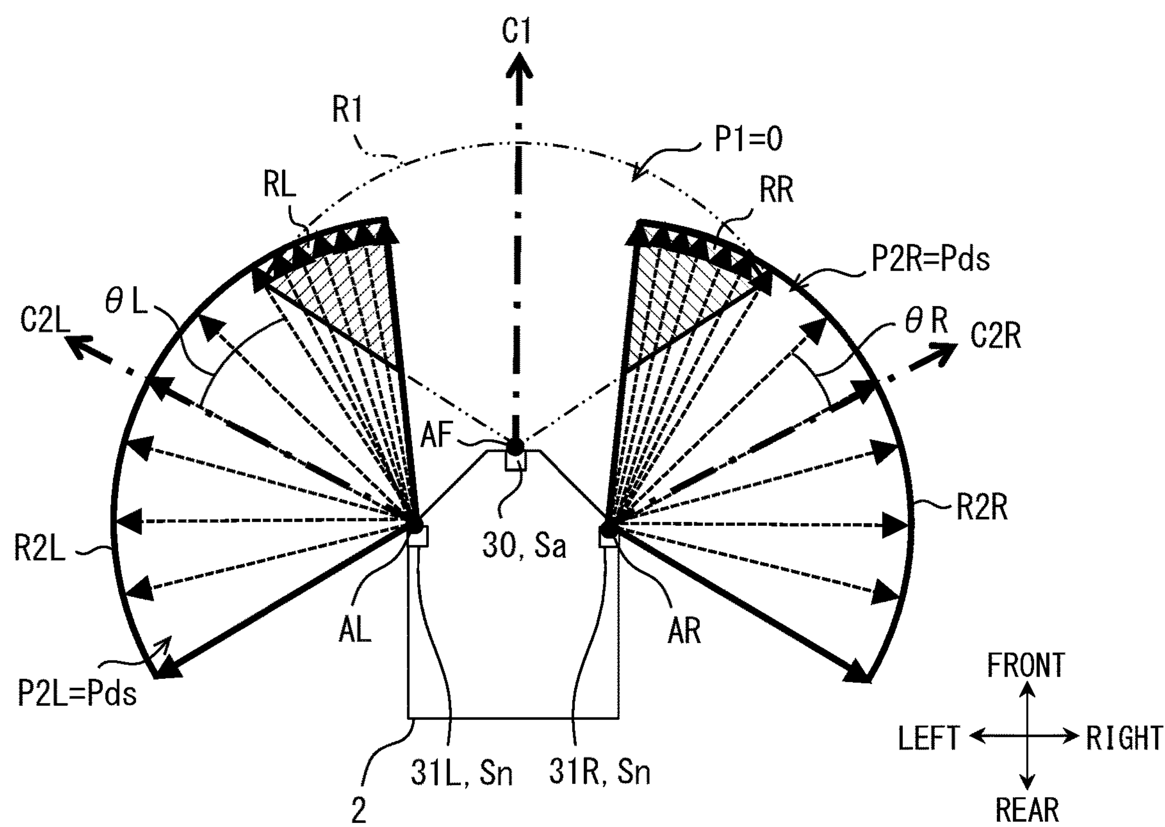
FIG. 5 is a schematic diagram illustrating the beam control block according to an embodiment.
Figure 6:
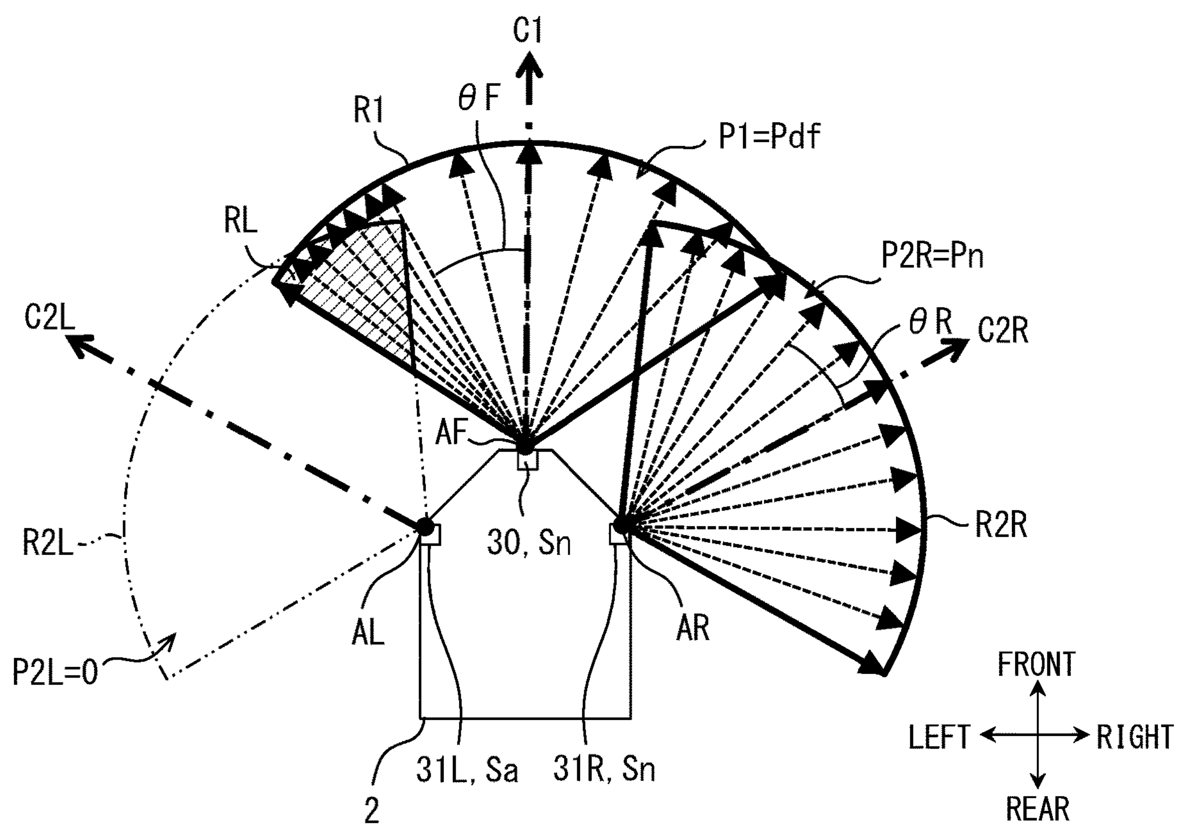
FIG. 6 is a schematic diagram illustrating the beam control block according to an embodiment.

As shown in FIG. 2, a combination of the front sensor 30 and the left sensor 31L is defined as a left sensor set SL. In the left sensor set SL, the beam irradiation range R1 of the front sensor 30 and the beam irradiation range R2 of the left sensor 31 have their respective beam steering axes AF and AL as shown in FIGS. 1, 5, 6, to form a left overlapping region RL that is a partial overlap of the two ranges R1 and R2L. The left overlapping region RL of the present embodiment is set as a part (i) including a left end of the front beam irradiation range R1, and (ii) including a front end of the right beam irradiation range R2.

On the other hand, a combination of the first optical sensor 30 and the right-side second optical sensor 31 is defined as a right sensor set SR.

Figure 7:
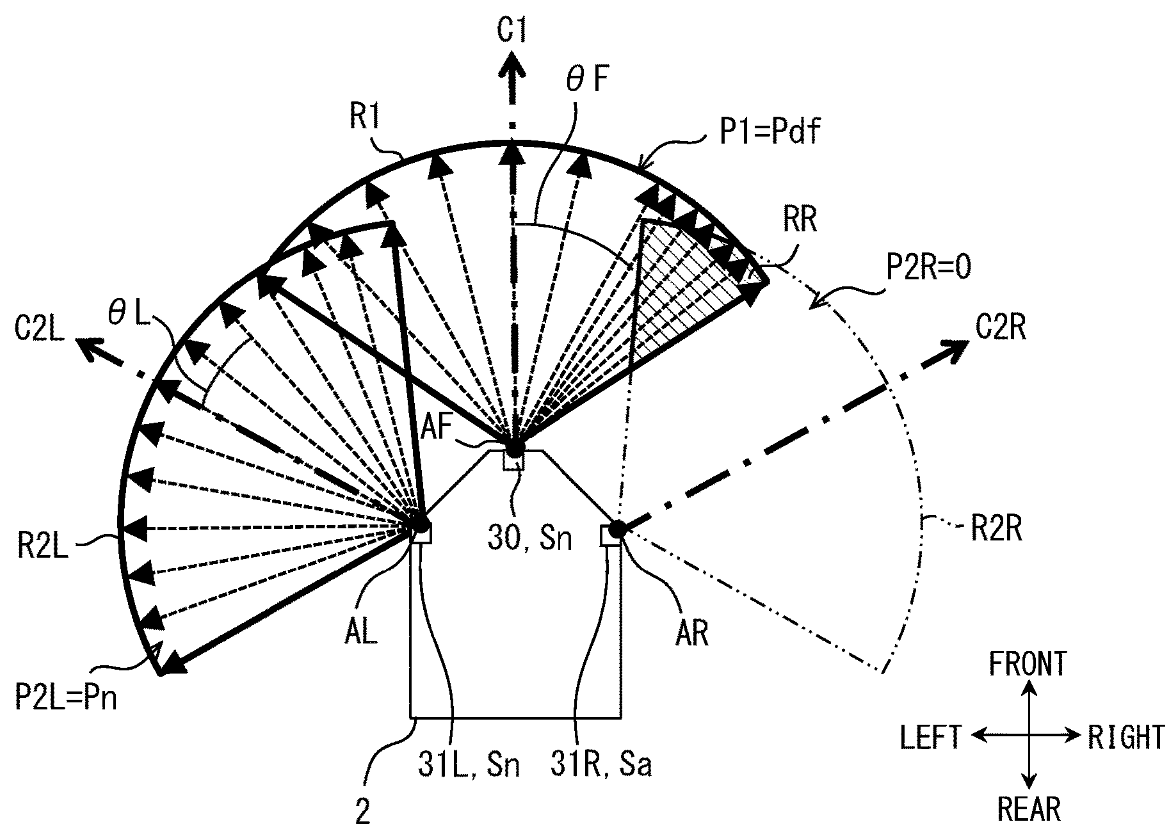
FIG. 7 is a schematic diagram illustrating the beam control block according to an embodiment.

In the right sensor set SR, the beam irradiation range R1 of the first optical sensor 30 and the beam irradiation range R2 of the right-side second optical sensor 31 have their beam steering axes A shifted substantially in parallel to each other as shown in FIGS. 1, 5, 7, to form a right overlapping region RR that is a partial overlap of the two ranges R1 and R2.

The right overlapping region RR of the present embodiment is set as a part (i) including a right end of the region right of (a line in) the beam reference direction C1 in the beam irradiation range R1, and (ii) including a front end of the region on a front side of the beam reference direction C2 in the beam irradiation range R2.

The imaging circuits 302 and 312 shown in FIG. 3 respectively expose, column by column, their plurality of pixels arranged in a column and row two-dimensions in the imaging elements 301 and 311, sequentially and at timings corresponding to each of the beam irradiation timings in the beam irradiation ranges R1 and R2L.

In such manner, the imaging circuits 302 and 312 which adopt a rolling shutter of sequential exposure make each pixel of the column exposed by the imaging elements 301 and 311 a scanning target. The imaging circuits 302 and 312 convert (i) a half value of a beam arrival time from the beam irradiation timing to a detection of the beam reflection in each pixel in the scanning target column into (ii) a distance value from the imaging elements 301 and 311 to the target 6. The imaging circuits 302 and 312 generate, as data, optical images (a front optical image IoF and a left optical image IoL) as (i) so-called distance images or (ii) point cloud images by associating the converted distance value with each pixel of the respective columns for data generation.

Note that, in the imaging elements 301 and 311, a brightness value corresponding to a beam reflection intensity sensed by each pixel in a column may also be associated with each pixel together with the converted distance value to generate, as data, the front optical image IoF or the left optical image IoL. Further, the imaging elements 301 and 311 may be provided with a function of picking up an image of an outside world of the vehicle 2 in accordance with an external light detected during an interruption period of the intermittent beam irradiation. In this case, the brightness value according to an intensity of the external light sensed by each pixel in the column in the imaging elements 301 and 311 may be associated with each pixel together with the converted distance value to generate, as data, the optical images IoF and IoL. Similarly, a right optical image IoR is generated.

As shown in FIG. 2, the sensor controller 1 is connected to the sensor system 3 via at least one of a LAN (Local Area Network), a wire harness, an internal bus, and the like.

The sensor controller 1 may be an ECU (Electronic Control Unit) dedicated to driving control, which performs advanced driving assistance or automatic driving control of the vehicle 2.

The sensor controller 1 may be an ECU (Electronic Control Unit) of a locator used for advanced driving assistance or automatic driving control of the vehicle 2.

The sensor controller 1 may be an ECU of a navigation device that navigates the driving of the vehicle 2.

The sensor controller 1 may be shared by at least one of the imaging circuits 302 and 312 of the optical sensors 30 and 31L.

The sensor controller 1 may be configured by a combination of plural types of these ECUs, circuits 302, 312, and the like that bear functions described below.

The sensor controller 1 is a dedicated computer including at least one memory 10 and one processor 12. The memory 10 stores or "memorizes" a computer-readable program and data in at least one kind of non-transitory, tangible storage medium (e.g., semiconductor memory, magnetic medium, optical medium, etc.). The processor 12 includes, as a core, at least one of a CPU (Central Processing Unit), a GPU (Graphics Processing Unit), a RISC (Reduced Instruction Set Computer)-CPU, and the like.

The processor 12 performs a plurality of instructions included in the sensor control program stored in the memory 10. Thereby, the sensor controller 1 constructs a plurality of functional blocks that collectively control the optical sensors 30, 31L, and 31R as shown in FIG. 3. As described above, in the sensor controller 1, the sensor control program stored in the memory 10 for controlling the optical sensors 30, 31L, and 31R causes the processor 12 to execute a plurality of instructions, thereby constructing a plurality of functional blocks. A sensor determination block 100 and a beam control block 120 are included in the plurality of functional blocks. The functional blocks may be partially or totally electric circuits.

The sensor determination block 100 monitors the states of the optical sensors 30, 31L, and 31R.

More specifically, when the sensor determination block 100 monitors the left sensor set SL and finds abnormality occurring in any of the optical sensors 30 and 31L forming the left sensor set SL, the sensor determination block 100 distinctively determines, as shown in FIGS. 5, 6, the abnormal sensor Sa in which abnormality has occurred and the normal sensor Sn, which maintains the normality. As a result of monitoring the right sensor set SR, if any of the optical sensors 30 and 31R forming the right sensor set SL has abnormality, the sensor determination block 100 distinctively determines the abnormal sensor Sa in which abnormality has occurred and the normal sensor Sn maintaining normality, or operating normally, as shown in FIGS. 5, 7.

Figure 4:
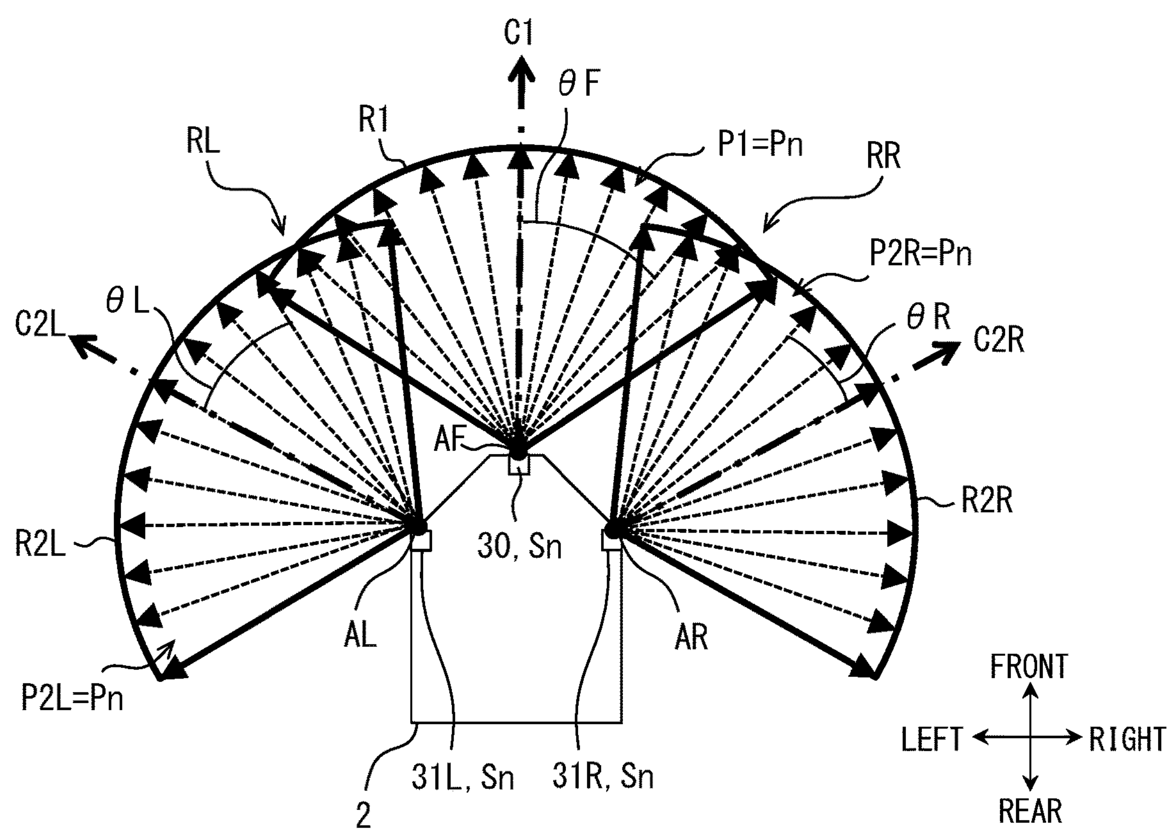
FIG. 4 is a schematic diagram illustrating a beam control block according to an embodiment.

In addition to the discrimination process, for the sensor sets SL and SR in which both the optical sensors 30, 31L, and 31R are maintaining normality, the sensor determination block 100 recognizes both of them as normal sensors Sn as shown in FIG. 4. It should be noted that the sensor determination block 100 is premised that an event in which a plurality of the optical sensors 30 and 31 become abnormal at the same time does not occur.

The abnormality monitored by the sensor determination block 100 includes at least one of a steady failure of the optical sensors and a temporary malfunction of the optical sensors. Regardless of whether it is caused by the malfunction or failure of any of the components 300, 301, 302, 310, 311 and 312 of the optical sensors, when no normal optical image Io is output, the sensor determination block 100 may determine such a situation as abnormality of the sensors 30 and 31. Further, in either case of failure or malfunction, the sensor determination block 100 may determine a situation that at least one of the optical images (IoF, loL, or IoR) is not properly transmitted to the processor 12 from the optical sensors (the imaging circuits) as abnormal.

As shown in FIG. 3, the beam control block 120 controls the beam patterns P1 and P2L and P2R of the optical sensors 30 and 31L and 31R in response to the monitoring result of the sensor determination block 100. More specifically, the beam control block 120 performs a normal process in case of FIG. 4, in which both the common first optical sensor 30 and the individual second optical sensors (31L and 31R) in the sensor sets SL (30 and 31L), and SR (30 and 31R) are respectively determined as normal sensors Sn.

FIGS. 4, 8A/B/C, and 12A/B/C illustrate a normal process. In the normal process shown in FIGS. 4, 8A/B/C and 12A/B/C, the beam control block 120 controls the beam patterns P1 and P2L and P2R adjusted by the imaging circuits 302 and 312 of the normal sensors Sn to a normal pattern Pn. As shown in FIGS. 4 and 12, the normal pattern Pn defines the beam steering angles θ for each beam irradiation timing t at equal intervals, so that the beam irradiation densities are even in the beam irradiation ranges R1 and R2L and R2R of the normal sensors Sn (i.e., realizing even distribution of beam irradiation density). In FIG. 4, the normal pattern Pn for the left sensor 31L may be a mirror image of the normal pattern Pn for the right sensor 31R.

Figure 9A:
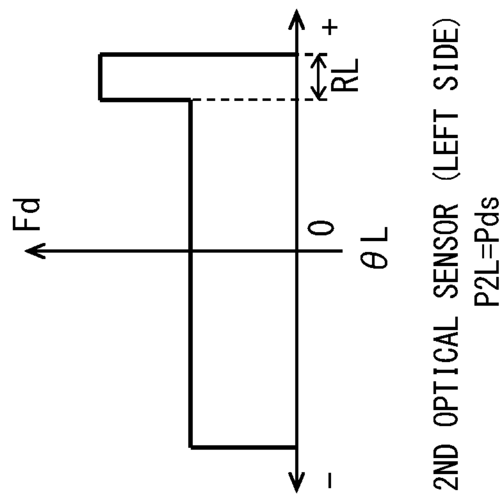
FIGS. 9A, 9B, 9C are respectively a characteristic diagram illustrating the beam control block according to an embodiment.
Figure 9B:
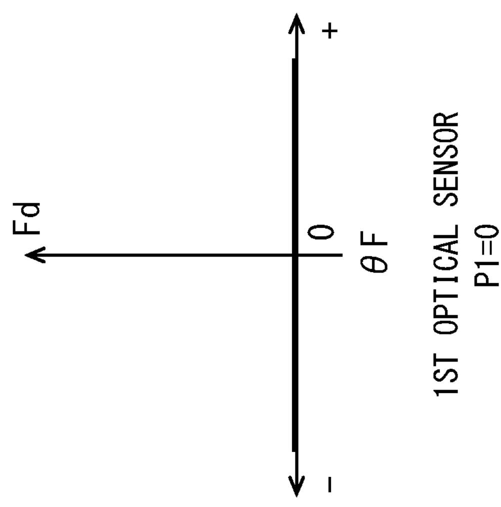
Figure 9C:
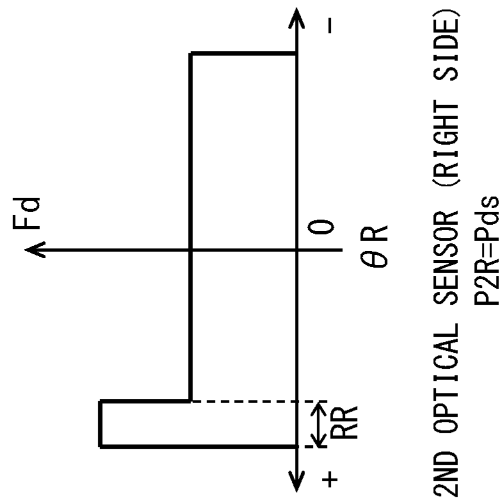

FIGS. 5, 9A/B/C, and 13A/B/C illustrate a side degeneration process. In case of FIG. 5, in which the beam control block 120 determines that the first optical sensor 30 (common to the sensor sets SL and SR) is determined as an abnormal sensor Sa, and the left sensor 31L and right sensor 31R are determined as normal sensors Sn the sensor sets SL and Sr, then the beam control block 120 performs a side degeneration process.

In the side degeneration process shown in FIGS. 5, 9A/B/C and 13A/B/C, the beam control block 120 prohibits the adjustment of the beam pattern P1 to the imaging circuit 302 of the abnormal sensor Sa by stopping the function of the abnormal sensor Sa. At the same time, the beam control block 120 controls the beam patterns P2L and P2R adjusted by the imaging circuit 312 of each normal sensor Sn to a side degeneration pattern Pds.

Figure 13A:
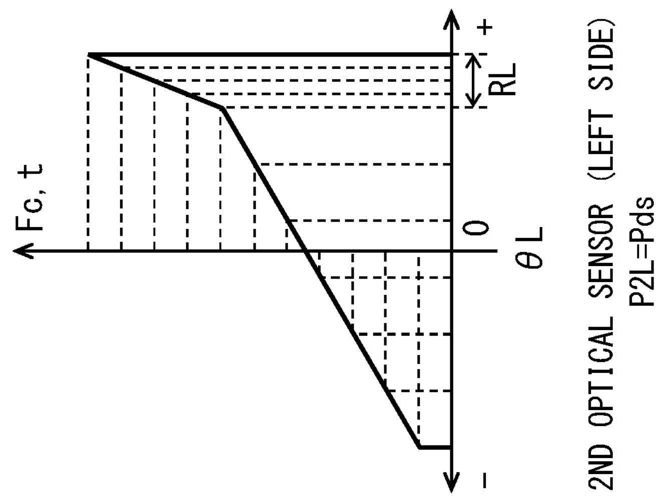
FIGS. 13A, 13B, 13C are respectively a characteristic diagram illustrating the beam control block according to an embodiment.
Figure 13B:
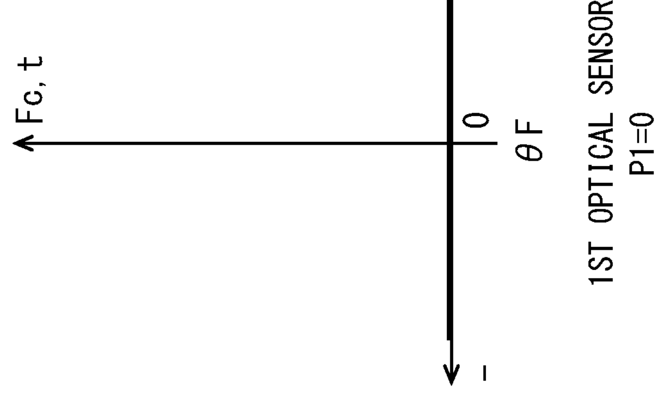
Figure 13C:
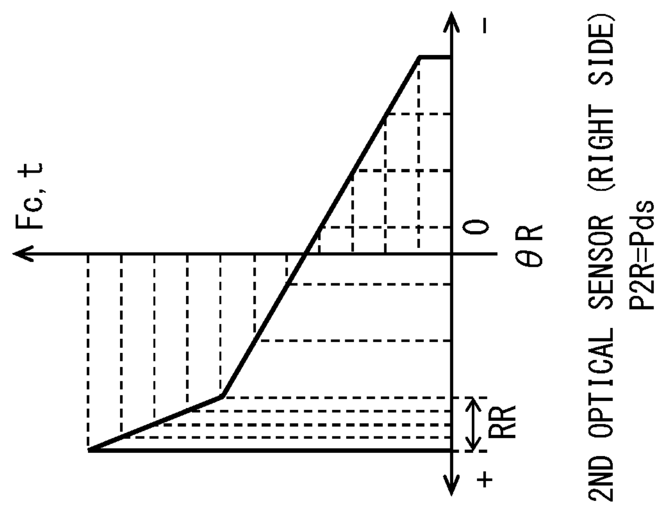

As shown in FIGS. 5 and 13A/B/C, the side degeneration pattern Pds defines the beam steering angles θ for each beam irradiation timing t at uneven intervals, so that the beam irradiation density is not uniform in the beam irradiation range R2 of each normal sensor Sn (i.e., realizing uneven distribution of beam irradiation density). In the course of realizing such uneven distribution, the side degeneration pattern Pds makes the beam distribution in the beam irradiation range R2 of each normal sensor Sn denser for the beam directed toward the overlapping regions RL and RR that partially overlap the beam irradiation ranges R1L and R1R of the abnormal sensors Sa than the beam directed toward the outside of those regions RL and RR.

Further, in particular, the side degeneration pattern Pds of the present embodiment makes the beam directed toward the outside of the overlapping regions RL, RR less dense (i.e., more sparse) than the beam in the normal pattern Pn of the normal process.

By performing the control of the side degeneration pattern Pds, the beam pattern P2 of each normal sensor Sn (31L and 31R) is concentrated toward (i.e., made denser in a region close to) the beam irradiation range R1 of the abnormal sensor Sa. For example, the normal process in FIG. 4 shows that 9 of 13 evenly spaced beams for the sensor 31L are located outside of the left overlap region RL. In contrast, the side degeneration process in FIG. 5 shows only 6 of 13 beams for the sensor 31L located outside of the left overlap region RL, resulting in a relatively sparse pattern outside of the left overlap region RL.

Figure 10A:
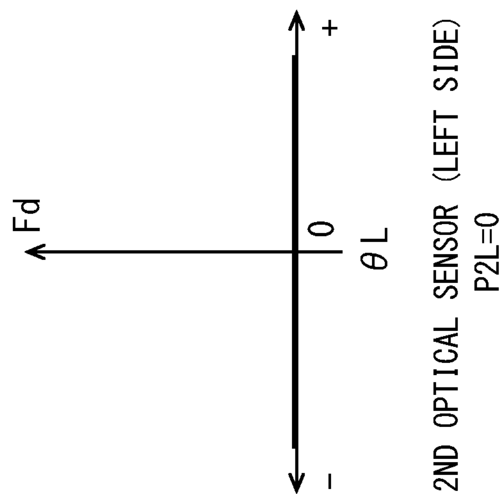
FIGS. 10A, 10B, 10C are respectively a characteristic diagram illustrating the beam control block according to an embodiment.

FIGS. 6, 10A/B/C, and 14A/B/C illustrate a left-side front degeneration process. In case of FIG. 6, in which the left sensor (the left-side second optical sensor) 31L is determined as an abnormal sensor Sa and the first optical sensor 30 is determined as a normal sensor Sn in the left sensor set SL, the beam control block 120 performs a left-side front degeneration process.

In the left-side front degeneration process shown in FIGS. 6, 10A/B/C, and 14A/B/C, the beam control block 120 prohibits the adjustment of the beam pattern P2 with respect to the imaging circuit 312 of the abnormal sensor Sa by stopping the function of the abnormal sensor Sa. At the same time, the beam control block 120 controls the front beam pattern P1 adjusted by the imaging circuit 302 of the normal sensor Sn to a left-side front degeneration pattern Pdf.

Figure 14A:
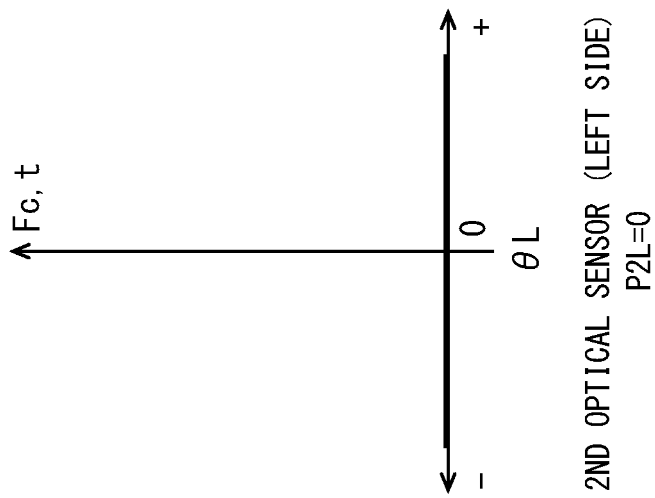
FIGS. 14A, 14B, 14C are respectively a characteristic diagram illustrating the beam control block according to an embodiment.

As shown in FIGS. 6 and 14A/B/C, the front degeneration pattern Pdf defines the beam steering angles θ for each beam irradiation timing t at uneven intervals, so that the beam irradiation density is not uniform in the beam irradiation range R1 of a normal sensor Sn (i.e., realizing uneven distribution of beam irradiation density).

Figure 10B:
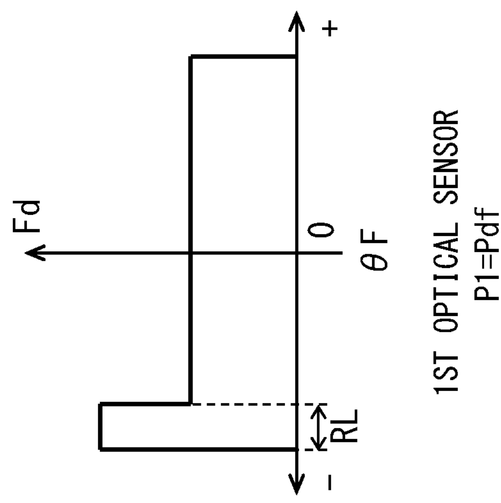
Figure 10C:
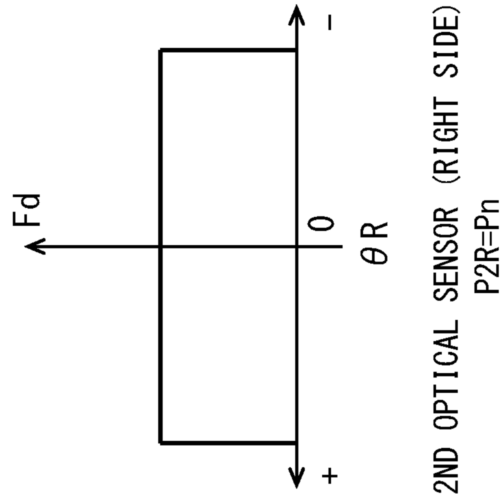
Figure 14B:
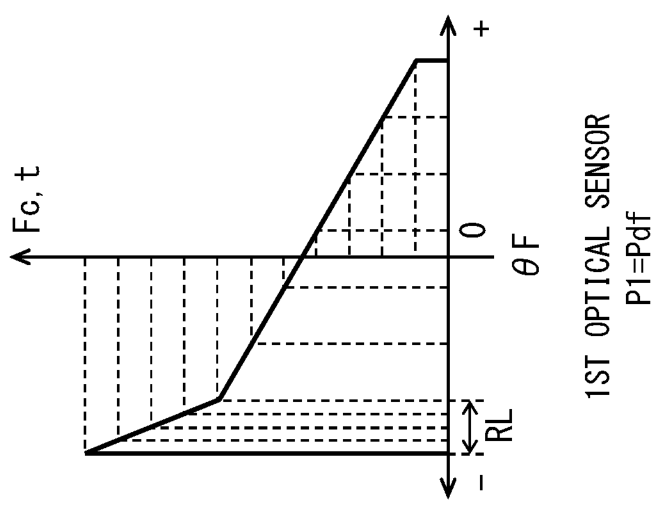
Figure 14C:
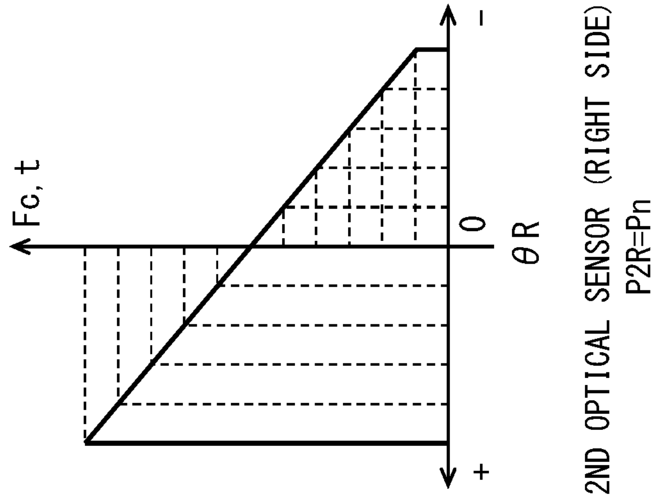

In the course of such uneven distribution, the front degeneration pattern Pdf of the left-side front degeneration process makes the beam distribution in the beam irradiation range R1 of the normal sensor Sn denser for the beam directed toward the left overlapping region RL that partially overlaps the beam irradiation range R1 of the abnormal sensor Sa (31L in this case) than the beam directed toward the outside of the region RL. Further, in particular, the front degeneration pattern Pdf (for a left-side front degeneration process in FIGS. 6, 10, and 14) makes the beam directed toward the outside of the left overlapping region RL less dense than the beam in the normal pattern Pn of the normal process. By performing the control of the front degeneration pattern Pdf, the beam pattern P1 of the normal sensor Sn is concentrated toward (i.e., made denser in a region overlapping) the beam irradiation range R2L of the abnormal sensor Sa. Note that the normal process of the normal pattern Pn is performed for the right sensor 31R which is maintained as a normal sensor Sn in the right sensor set SR.

Figure 11A:
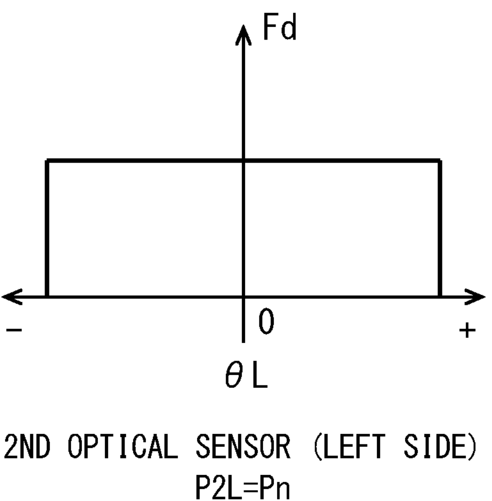
FIGS. 11A, 11B, 11C are respectively a characteristic diagram illustrating the beam control block according to an embodiment.
Figure 11B:
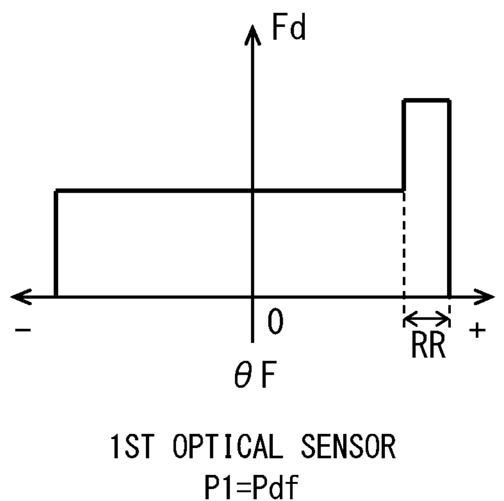
Figure 11C:
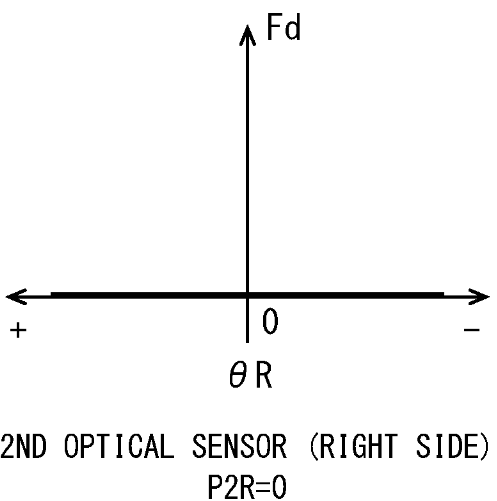
Figure 15A:
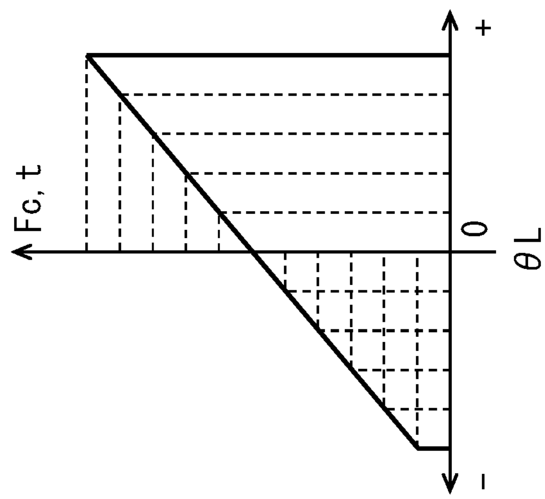
FIGS. 15A, 15B, 15C are respectively a characteristic diagram illustrating the beam control block according to an embodiment.
Figure 15B:
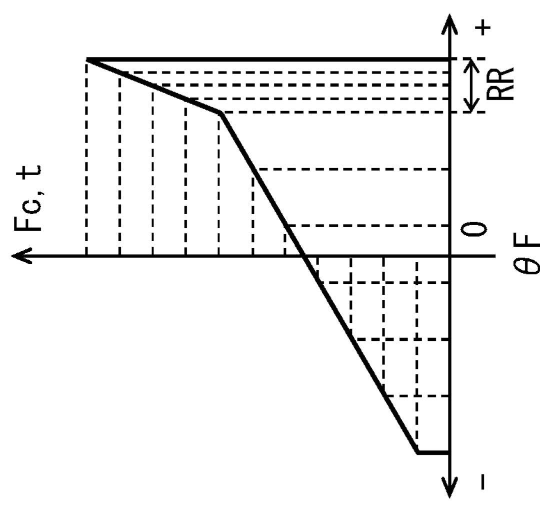
Figure 15C:
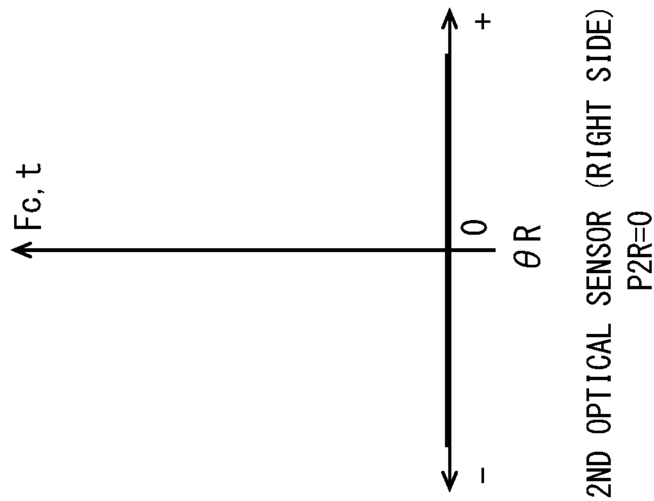

FIGS. 7, 11, and 15 illustrate a right-side front degeneration process. In case of FIG. 7, in which the right sensor 31R is determined as an abnormal sensor Sa, and the first optical sensor 30 is determined as a normal sensor Sn in the right sensor set SR, the beam control block 120 performs a right-side front degeneration process.

The right-side front degeneration process shown in FIGS. 7, 11A/B/C, and 15A/B/C is a process in which the "left side" is replaced with the "right side" with respect to the above left-side front degeneration process.

In particular, as shown in FIGS. 7 and 15A/B/C, the right-side front degeneration pattern Pdf of the right-side front degeneration process makes the beam distribution in the beam irradiation range R1 of the normal sensor Sn (front sensor 30 in this case) denser for the beam directed toward the right overlapping region RR that partially overlaps the beam irradiation range R1 of the abnormal sensor Sa (right sensor 31R in this case) than the beam directed toward the outside of the region RR.

In the above, the beam control block 120 determines the beam irradiation density according to the process type in the beam irradiation ranges R1 and R2L and R2R of the optical sensors 30 and 31L and 31R serving either as a normal sensor Sn or an abnormal sensor Sa as a function of the beam steering angles about their respective beam steering axes.

That is, the beam control block 120 defines a density function Fd to be realized in the beam irradiation ranges R1 and R2 of the optical sensors 30 and 31 for each process type, as shown in FIGS. 8A/B/C to 11A/B/C.

Figure 12A:
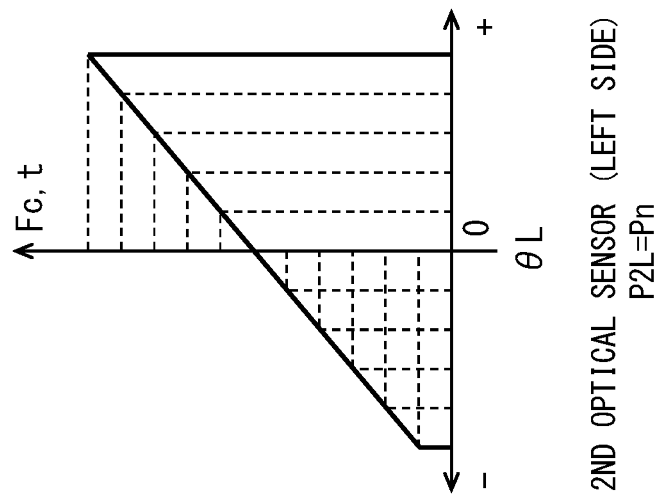
FIGS. 12A, 12B, 12C are respectively a characteristic diagram illustrating the beam control block according to an embodiment.
Figure 12B:
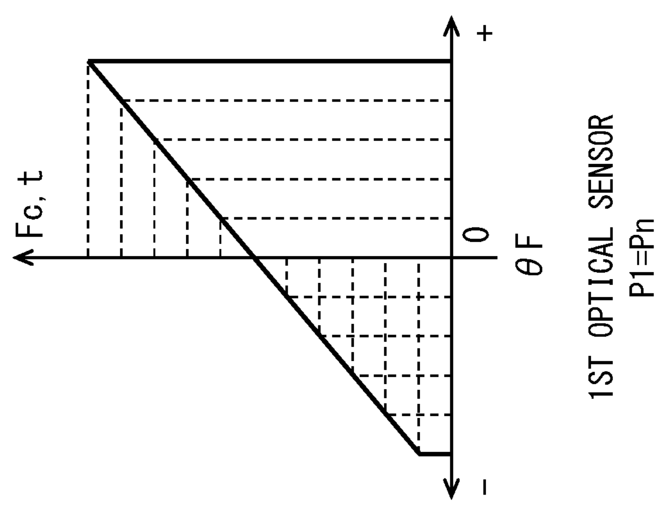
Figure 12C:
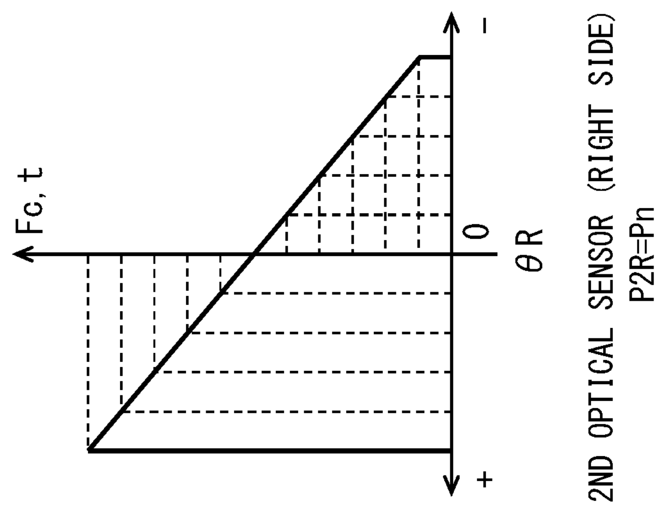

The beam control block 120 further converts the defined density function Fd into a cumulative distribution function Fc in which the beam irradiation density is accumulated with respect to the beam steering angle θ as shown in FIGS. 12A/B/C to 15A/B/C.

The beam control block 120 defines a beam steering angle (θL, θF, or θR) corresponding to each beam irradiation timing t at equal intervals in the converted cumulative distribution function Fc for each process type. Here, in the degeneration process of the present embodiment as shown in FIGS. 9A/B/C to 11A/B/C, the density function Fd (i.e., the beam irradiation density) has a step shape stepping up in the overlapping regions RL and RR where the beam is made dense with respect to other regions outside the regions RL, RR.

As a result, in the degeneration process of the present embodiment as shown in FIGS. 13A/B/C to 15A/B/C, the cumulative distribution function Fc in the overlapping regions RL and RR where the beam is made dense is a linear function having a slope different from (greater than) that outside the regions RL and RR.

In such manner, the distribution of the beam steering angle θ defined for each beam irradiation timing t is given as a distribution of the beam irradiation density that satisfies the density function Fd, i.e., as the beam patterns P1 and P2 according to the process type, to the optical sensors 30 and 31. That is, the beam patterns P1 and P2 of the optical sensors 30 and 31 are controlled by the beam control block 120 as one of the normal pattern Pn and the degeneration patterns Pds and Pdf that satisfies the density function Fd for each process type.

According to the above, in the present embodiment, the sensor determination block 100 corresponds to a "sensor determination unit" and the beam control block 120 corresponds to a "beam control unit".

A flow of a sensor control method in which the sensor controller 1 controls the optical sensors 30 and 31 in cooperation with the sensor determination block 100 and the beam control block 120 described so far is described with reference to FIG. 16. It should be noted that this flow of control is performed for each shutter frame that is commonly repeated by the optical sensors 30 and 31 after the start of traveling of the vehicle 2. Further, "S" in this flow means a plurality of steps performed by a plurality of instructions included in the sensor control program.

In S101, the sensor determination block 100 monitors the states of the optical sensors 30 and 31 forming the sensor sets SL and SR.

In subsequent S102, the sensor determination block 100 determines whether or not an abnormality has occurred in any of the optical sensors 30 and 31 in each sensor set SL and SR.

In S102, when all of the optical sensors 30 and 31L and 31F of the sensor sets SL and SR maintain normality (S102=NO, there is no abnormality), the sensor determination block 100 proceeds downward to S103. The sensor determination block 100 in S103 determines that all the optical sensors 30 and 31L and 31R are all normal sensors Sn. In subsequent S104, the beam control block 120 performs the normal process as discussed above regarding FIGS. 4, 8A/B/C, and 12A/B/C.

In S102, when an abnormality occurs in the front sensor 30 of each sensor set SL, SR, the sensor determination block 100 proceeds to S105. The sensor determination block 100 in S105 determines the front sensor 30 in which the abnormality has occurred is an abnormal sensor Sa. At the same time, the sensor determination block 100 in S105 determines the as the left sensor 31L and the right sensor 31R are normal.

In S106 subsequent to S105, the beam control block 120 performs the side degeneration process as discussed above regarding FIGS. 5, 9A/B/C, and 13A/B/C.

When an abnormality occurs in the left sensor 31L of the left sensor set SL in S102, the sensor determination block 100 proceeds to S107. The sensor determination block 100 in S107 determines the left sensor 31L in which the abnormality has occurred is an abnormal sensor Sa. At the same time, the sensor determination block 100 in S107 determines the front sensor 30 and the right sensor 31R are normal.

In S108 subsequent to S107, the beam control block 120 performs the left-side front degeneration process as discussed above regarding FIGS. 6, 10A/B/C, and 14A/B/C.

Note that, in S108, the beam control block 120 performs the normal process for the right sensor 31R.

In S102, when an abnormality occurs in the right sensor 31R of the right sensor set SR, the sensor determination block 100 performs S109, and then the beam control block 120 performs S110. Step S110 performs a right-side front degeneration process as described above with respect to FIGS. 7, 11A/B/C, and 15.

The beam control block 120 in S104, S106, S108, and S110 sets the beam irradiation densities in the beam irradiation ranges R1 and R2L and R2R of the optical sensors 30 and 31L and 31R of the normal sensor Sn or the abnormal sensor Sa as a function of the beam steering angle for each process type. Therefore, the beam control block 120 in S104, S106, S108, and S110 controls the beam patterns P1, P2L, and P2R of the optical sensors 30, 31L, and 31R respectively to make a density function satisfying pattern, which satisfies the density function Fd made from the beam patterns Pn, Pds, Pdf for each process type. Note that, when any one of S104, S106, S108, and S110 corresponding to the determination result in S102 ends, a current execution cycle of the flow is complete.

As described above, in the present embodiment, S101, S102, S103, S105, S107, and S109 correspond to a "sensor determination process," and S104, S106, S108, and S110 correspond to a "beam control process".

(Operational Effects)

The effects of the present embodiment described above are described below.

According to the present embodiment, the sensors 30 and 31L and 31R are mounted on the vehicle 2, which respectively cover the beam irradiation ranges R1 and R2L and R2R for scanning the front direction and the side directions of the vehicle in an overlapping manner, with the shift of those irradiation ranges from each other. When abnormality occurs in one of the optical sensors under such mounting configuration, the abnormal sensor Sa in which abnormality has occurred and the normal sensors Sn that maintain normality are distinctively determined. As a result, the beam patterns P1 and P2L and P2R in the beam irradiation range of the normal sensors Sn are controlled to have the degeneration patterns Pdf and Pds, thereby the beam irradiation range of the abnormal sensor Sa is scanned (i.e., covered) as much as possible, by the beam irradiation range of the normal sensor Sn concentrated toward the beam irradiation range of the abnormal sensor. Therefore, it is possible to suppress the deterioration of the total scanning capability.

According to the present embodiment, the beam irradiation density in the beam irradiation range of the normal sensor Sn is set as a function of the beam steering angle θ, for controlling the beam patterns P1 and P2L and P2R of the normal sensor Sn to have degeneration patterns (such as Pdf and Pds satisfying the density function Fd). According to such configuration, certain regions (i.e., the overlapping regions RL and RR in the present embodiment) in the beam irradiation range of the normal sensor Sn to be concentrated toward the beam irradiation range of the abnormal sensor Sa are increased so as to increase a coverage ratio for scanning for the abnormal sensor Sa, thereby enabling an accurate control of such regions RL, RR with respect to the beam steering angles. Therefore, it is possible to contribute to the suppression of the reduction in the total scanning capability.

The beam pattern control to the degeneration patterns Pdf and Pds according to the present embodiment is performed in such a manner that the beams directed to the overlapping regions RL and RR that partially overlap the beam irradiation range of the abnormal sensor Sa in the beam irradiation range of the normal sensor Sn are made denser than the beams directed outside of the regions RL and RR. According to such configuration, the coverage ratio for scanning for the abnormal sensor Sa can be increased by the beam that is concentrated in the overlapping regions RL and RR with the abnormal sensor Sa in the beam irradiation range of the normal sensor Sn. Therefore, it is possible to secure the effects of suppressing the decrease in the total scanning capability.

OTHER EMBODIMENTS

Although one embodiment has been described above, the present disclosure is not construed as being limited to the embodiment, and can be applied to various embodiments without departing from the scope of the present disclosure.

The sensor controller 1 of a modification of the above may be a dedicated computer including at least one of a digital circuit and an analog circuit as a processor. Here, in particular, the digital circuit includes, for example, at least one of ASIC (Application Specific Integrated Circuit), FPGA (Field Programmable Gate Array), SOC (System on a Chip), PGA (Programmable Gate Array), and CPLD (Complex Programmable Logic Device) and the like. Such a digital circuit may include a memory in which a program is stored.

Figure 17:
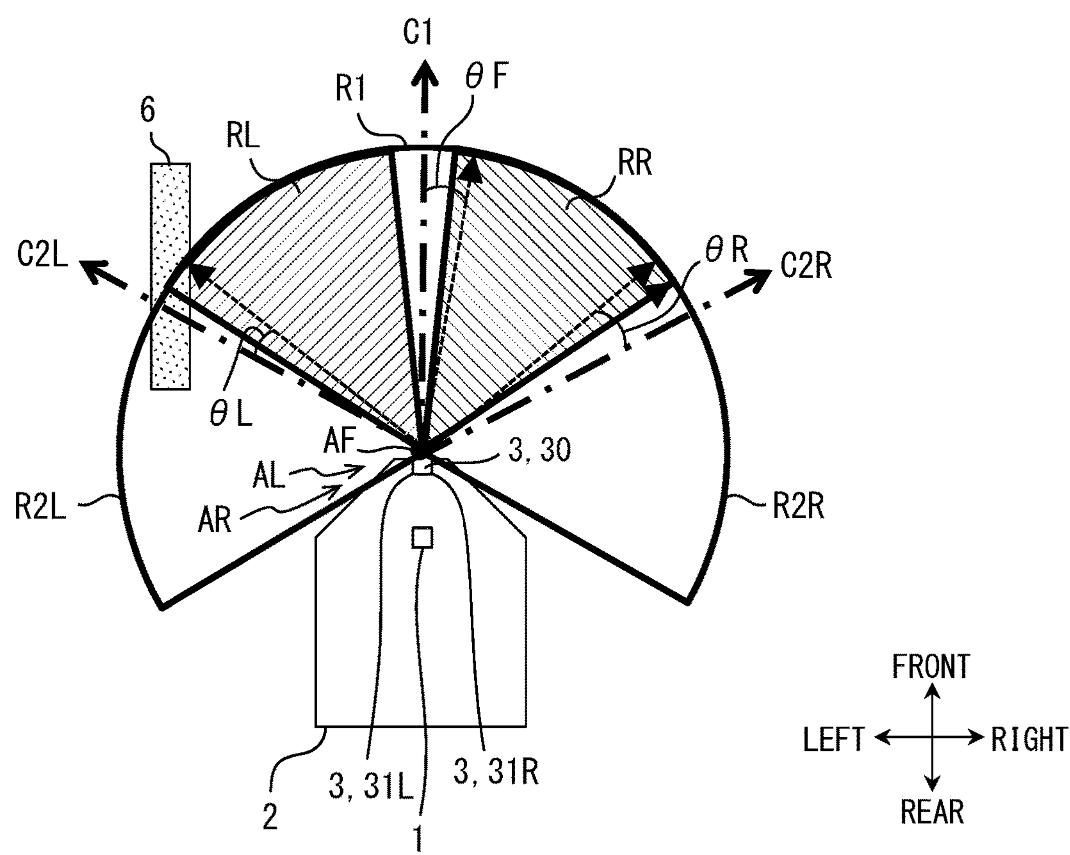
FIG. 17 is a schematic diagram for explaining a sensor system mounted on a vehicle together with a sensor controller according to a modification of the embodiment.

In the sensor system 3 of another modification, as shown in FIG. 17, even if the beam steering axes AF, AL, and AR that are the start points of the beam irradiation ranges R1 and R2L and R2R in the respective optical sensors 30 and 31L and 31R may match (that is, may be coaxial) with each other.

Figure 18:
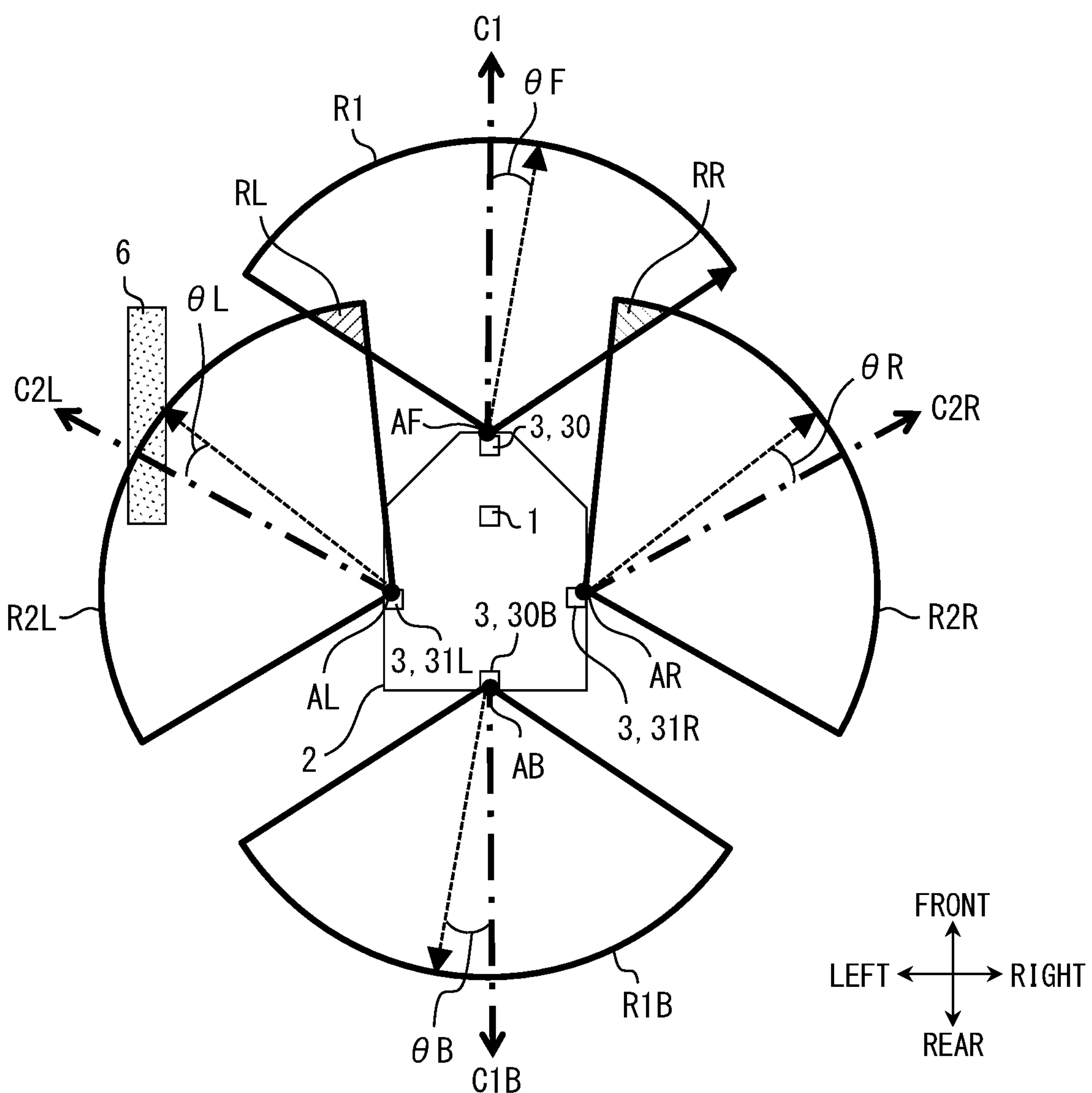
FIG. 18 is a schematic diagram for explaining a sensor system mounted on a vehicle together with a sensor controller according to another modification of the embodiment.

In the sensor system 3 of yet another modification, as shown in FIG. 18, a rear sensor 30B having a beam reference direction C1B of the beam irradiation range R1B oriented in a rear direction of the vehicle 2 may be mounted on a rear part of the vehicle 2. In such case, the beam irradiation range R1 of the rear sensor 30B that scans a rear field of the vehicle 2 may be mounted in place of or in addition to the first optical sensor 30 that mainly scans the front field. Here, particularly in the latter case, when one of the front and rear sensors 30 and 30B is determined as an abnormal sensor Sa, the other of the two sensors may be determined as a normal sensor Sn and the normal process may be performed for such sensor.

Continuing with FIG. 18, some of the beam irradiation ranges may be completely non-overlapping (e.g., the range R1R of the rear sensor 30 does NOT overlap with either of the ranges R2L and R2R of the side sensors 31L and 31R). Note that the beam irradiation range R1B of the rear 3B0 (that scans mainly in the rear field illustrated in FIG. 18) may partially overlap (not shown) the beam irradiation range R2L and R2R to form overlap regions (not shown) similar to the overlap regions RL and RR described above.

In S104, S106, S108, and S110 by the beam control block 120 of the modification, the beam intensity for each beam steering angle θ at equal intervals or uneven intervals may be adjusted to control the beam patterns P1 and P2 of the beam irradiation density.

In S106, S108, and S110 by the beam control block 120 of the modification, the degeneration patterns Pds and Pdf may have the "outside" beam having substantially the same density as the beam in the normal pattern Pn of the normal process (i.e., "outside" beams directed to the outside of the overlapping regions RL and RR).

Figure 19A:
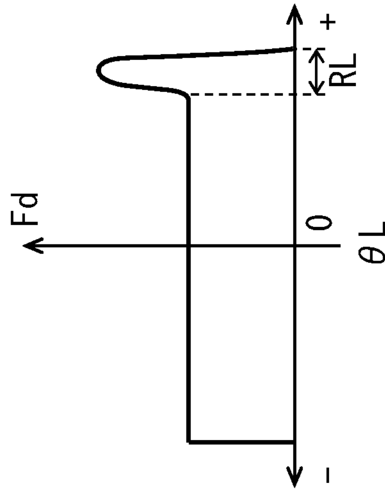
FIGS. 19A, 19B are respectively a characteristic diagram illustrating the beam control block according to yet another modification of the embodiment.
Figure 19B:
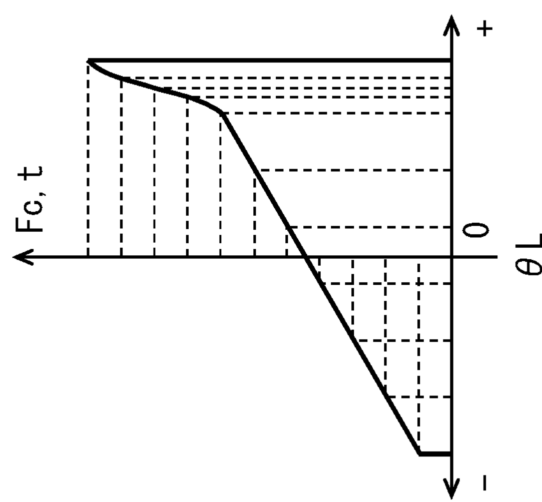

In S106, S108, and S110 by the beam control block 120 of the modification, the density function Fd in the overlapping regions RL and RR in which the beams are made denser may be set to have a non-linearly increased function relative to the region outside of the regions RL and RR as shown in FIGS. 19A/B (i.e., an example of S106 is shown in FIGS. 19A/B). In such case, a cumulative distribution function Fc in the overlapping regions RL and RR where the beams are made dense becomes a non-linear function different from a linear function outside the regions RL and RR as shown in FIGS. 19A/B.

What is claimed is:

1. A sensor controller for controlling a front sensor and a side sensor, the sensor controller comprising:

a sensor determination unit, when abnormality occurs in either the front sensor or the side sensor, distinctively determining an abnormal sensor in which abnormality has occurred and a normal sensor that maintains normality; and a beam controller controlling a beam pattern in a beam irradiation range of the normal sensor to have a degeneration pattern concentrated in an overlap region that overlaps a beam irradiation range of the abnormal sensor, wherein the beam controller controls the beam pattern to the degeneration pattern that satisfies a density function, which determines a beam irradiation density in the beam irradiation range of the normal sensor as a function of a beam steering angle.

2. The sensor controller according to claim 1, wherein the beam controller makes a beam directed to an overlapping region that partially overlaps the beam irradiation range of the abnormal sensor in the beam irradiation range of the normal sensor denser than a beam directed toward outside of the overlapping region.

3. A sensor control method performed by a processor for controlling a first optical sensor and a second optical sensor respectively having beam irradiation ranges, shifted from each other, for scanning a substantially frontward direction and substantially sideward direction relative to a vehicle, the sensor control method comprising:

a sensor determination process, when abnormality occurs in either the first optical sensor or the second optical sensor, identifying an abnormal sensor in which abnormality has occurred and identifying a normal sensor that maintains normality; and a beam control process for controlling a beam pattern in the beam irradiation range of the normal sensor to have a degeneration pattern concentrated toward a beam irradiation range of the abnormal sensor, wherein the beam control process controls the beam pattern to the degeneration pattern that satisfies a density function, which determines a beam irradiation density in the beam irradiation range of the normal sensor as a function of a beam steering angle.

4. The sensor control method according to claim 3, wherein the beam control process makes a beam directed to an overlapping region that partially overlaps the beam irradiation range of the abnormal sensor in the beam irradiation range of the normal sensor denser than a beam directed toward outside of the overlapping region.

5. A storage medium storing instructions that, when executed:

cause a processor to control a front sensor and a side sensor respectively having beam irradiation ranges, shifted from each other, for scanning a front field and a side field of a vehicle, perform a sensor determination process including:

(i) determining that an abnormality occurs in either the front sensor or the side sensor, (ii) identifying the sensor in which the abnormality occurred as an abnormal sensor, and (iii) identifying the sensor in which the abnormality did not occur as a normal sensor, and perform a beam control process controlling a beam pattern in the beam irradiation range of the normal sensor to have a degeneration pattern concentrated toward a beam irradiation range of the abnormal sensor, wherein the beam control process controls the degeneration pattern according to a density function such that the beam irradiation range of the normal sensor is a function of a beam steering angle.

6. The storage medium according to claim 5, wherein the beam control process controls a beam directed to an overlapping region that partially overlaps the beam irradiation range of the abnormal sensor such that the beam is denser in an overlap region than outside of the overlap region.

7. A sensor controller comprising:

at least one processor; and a memory storing instructions that, when executed:

control a sensor system including:

(i) a left sensor configured to radiate substantially leftwards and to generate a left beam irradiation range relative to a left sensor axis, such that a left beam is steered by a left steering angle relative to a left beam reference direction, (ii) a front sensor configured to radiate substantially frontwards and to generate a front beam irradiation range relative to a front sensor axis, such that a front beam is steered by a front steering angle relative to a front beam reference direction, and (iii) a right sensor configured to radiate substantially rightwards and to generate a right beam irradiation range relative to a right sensor axis, such that a right beam is steered by a right steering angle relative to a right beam reference direction, perform a monitoring process, determine an abnormality determination process, perform a sensing process based upon results from the abnormality determination process, wherein the sensing process is selected from a set of processes including at least the following four processes:

(i) a normal process, (ii) a side degeneration process, (iii) a left-side front degeneration process, and (iv) a right-side front degeneration process, wherein the left beam irradiation range partially overlaps the front beam irradiation range to form a left overlapping region, and wherein the right beam irradiation range partially overlaps the front beam irradiation range to form a right overlapping region, wherein the abnormality determination process determines that the left sensor, the front sensor, and the right sensor are all normal, wherein the normal process is selected, and wherein the normal process includes:

(i) generate a left beam pattern with a left normal density function having a first positive constant value within the left beam irradiation range, (ii) generate a front beam pattern with a front normal density function having a second positive constant value within the front beam irradiation range, and (iii) generate a right beam pattern with a right normal density function having a third positive constant value.

8. The sensor controller of claim 7, wherein the abnormality determination process determines that the left sensor is normal, the front sensor is abnormal, and the right sensor is normal, wherein the side degeneration process is selected, and wherein the side degeneration process includes:

(i) generate a left beam pattern with a left degenerate density function that is greater in the left overlapping region than in a non-overlapping region of the left beam irradiation range, (ii) generate no front beam pattern, and (iii) generate a right beam pattern with a right degenerate density function that is greater in the right overlapping region than in a non-overlapping region of the right beam irradiation range.

9. The sensor controller of claim 7, wherein the abnormality determination process determines that the left sensor is normal, the front sensor is normal, and the right sensor is abnormal, wherein the right-side front degeneration process is selected, and wherein the right-side front degeneration process includes:

(i) generate a left beam pattern with a left normal density function having a first positive constant value within the left beam irradiation range, (ii) generate a front beam pattern with a right-side front degenerate density function that is greater in the right overlapping region than in a non-overlapping region of the front beam irradiation range, and (iii) generate no right beam pattern.

* * * * *